United States Patent Office 3,376,287
Patented Apr. 2, 1968

3,376,287
NOVEL INHIBITED GRANULAR STARCH PRODUCTS PREPARED BY THE REACTION OF STARCH WITH PHOSGENE
Wadym Jarowenko, Plainfield, and Morton W. Rutenberg, North Plainfield, N.J., assignors to National Starch and Chemical Corporation, New York, N.Y., a corporation of Delaware
No Drawing. Filed June 28, 1965, Ser. No. 467,677
4 Claims. (Cl. 260—233.5)

ABSTRACT OF THE DISCLOSURE

Inhibited, granular starch derivatives crosslinked by labile, carbonate ester linkages characterized by their instability in the presence of acids, bases or heat; said derivatives resulting from the reaction of starch with phosgene. The thus produced derivatives display utility as thickening agents for food products and in various sizing, coating and adhesive applications.

---

This invention relates to a novel method for the inhibition of granular starch products and to the inhibited starch products thereby obtained.

In our use of the term "inhibited starch," we refer to a starch in which the disintegration of the starch granules is retarded under conditions whereby the intact starch granules would ordinarily swell and burst. Thus, inhibited starches exhibit a markedly reduced tendency to gelatinize and also display a comparatively short, non-cohesive consistency after cooking. The degree of inhibition can often be controlled and varied over a wide range so as to produce starch products in which the swelling of the granules is only slightly retarded, and through successive stages to starch products in which the swelling of the granules is so highly retarded or inhibited that they cannot remain suspended in water but will, rather, settle out as a separate phase.

Starch may be inhibited, while in granular form, by reaction with polyfunctional reagents, such as di-epoxides and di-anhydrides, etc., which crosslink the starch molecules within the granule. This reaction results in the formation of covalent chemical linkages between the molecules, thereby adding to the bonding forces which hold the granule together. This increase in the strength of the cohesive forces in the granule thus results in the need for a greater energy requirement in order to disrupt the granule upon cooking such inhibited starch in water.

Inhibited granular starches are desired for various industrial uses. They are particularly useful in applications where the cohesiveness and stringiness of native starches are found to be objectionable. Thus, for example, in the food industry starch products yielding short, smooth pastes on cooking are used as thickening agents in pies, sauces and soups, etc.

It is often advantageous that the crosslinkages which are introduced into inhibited starch products should be labile, i.e. they should be readily destructible. Among the methods for destroying or eliminating these crosslinkages are treatments of the inhibited starches with heat, acids or bases, etc.

It is the object of this invention to provide a novel method for the preparation of inhibited starch products.

It is a further object to prepare inhibited starch products containing labile crosslinkages, thus enabling these products to exhibit delayed or latent swelling characteristics.

Various other objects and advantages of this invention will become apparent from the following description.

Thus, we have now found that by reacting granular starch bases with phosgene at controlled temperatures and pH levels in either aqueous or non-aqueous media, we may prepare inhibited granular starch products, presumably crosslinked by carbonate ester linkages; these reaction products being produced according to the following equation:

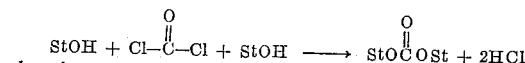

wherein StOH represents the starch molecule. We have further found that the resulting carbonate ester linkages are labile, thereby providing the inhibited granular starch products of our invention with the unique ability to be subsequently converted into completely swollen products.

The applicable starch base materials which may be used in preparing our novel starch products must be in intact granule form. They may be derived from any plant source including corn, potato, sweet potato, wheat, rice, sago, tapioca, waxy maize, sorghum, high amylose corn or the like. Also included are the conversion products derived from any of the latter bases including, for example, dextrines prepared by the hydrolytic action of acid and/or heat; oxidized starches prepared by treatment with oxidants such as sodium hypochlorite; and, fluidity or thin boiling starches prepared by enzyme conversion or by mild acid hydrolysis. It is also possible to employ, in our process, any substituted ether or ester derivative of these starch bases, provided that such ester or ether derivatives still retain hydroxyl groups which are available for further reaction. Our use of the term "starch base" is thus seen to include any amylaceous substances, whether untreated or chemically modified, which are in granule form and which still retain free hydroxyl groups capable of entering into the crosslinking reaction of this invention.

As previously mentioned, the novel reaction of this invention may be carried out in either aqueous or non-aqueous systems. Any inert, organic solvent which has no active sites to react with phosgene may be used in the non-aqueous reaction systems. Among the organic solvents thus applicable for use are toluene, pyridine, 1,2-dichloroethane, heptane, acetone, etc. It should be noted, however, that for reasons of economy and ease of handling water is the preferred solvent.

When aqueous systems are employed, it is necessary to include an acid acceptor in order to neutralize the hydrochloric acid formed during the course of the reaction and thereby maintain the desired pH level of the system. These acid acceptors may be selected from among the group consisting of the alkali metal hydroxides, alkali metal carbonates, alkali metal phosphates, alkali metal borates, alkaline-earth hydroxides, alkaline-earth carbonates, tertiary amines and quaternary ammonium bases. When non-aqueous reaction systems are employed, acid acceptors, though normally utilized, may be excluded, if so desired. Thus, in addition to the acid acceptors already mentioned, it is also possible to employ various primary, secondary and tertiary amines, such as triethylamine and ethylene diamine. It should be noted that tertiary amines are preferred since primary and secondary amines, although effective may interact with the phosgene.

In general, the novel process of this invention comprises reacting phosgene with a suspension, in the desired aqueous or non-aqueous solvent, of the selected starch base. The phosgene is introduced into the system in either a gaseous or liquid state; the choice of method of such introduction being left to the discretion of the practitioner. As noted above, if an aqueous system is employed, an acid acceptor should be present therein while if a non-aqueous medium is used, the presence of an acid acceptor is preferred, though not absolutely essential. The reaction is carried out at temperatures ranging from about 0° C. to 60° C. and preferably from about 1° C. to 8° C.

The pH level of the system may range from about 3 to 11, but it is preferable to maintain it at a level of from about 5 to 7. Needless to say, the maintenance of the proper pH level is assured by the addition of sufficient amounts of acid acceptor.

It should be noted that both higher and lower temperatures as well as elevated pressures may be utilized in the reaction. However, atmospheric pressures and lower temperatures are preferred, in that the necessity for using the special equipment required by high temperature-pressure reaction systems is avoided.

After completion of the phosgene addition, the system is maintained, under agitation, at the preferred pH level and temperature for a period of from about ½ to 16 hours. The slurry is then adjusted to a pH level of from about 3 to 7, and preferably to a pH of 5, by the addition of either dilute acid or alkali, as required. The resulting product is then filtered, washed and finally dried.

With respect to proportions, the phosgene should be present in the system in concentrations ranging from about 0.1 to 100 parts, by weight, per 100 parts of starch base. The solvent should be present in the system in sufficient concentration so as to result in a system having a total solids content of from about 10 to 45%, by weight. The acid acceptor, where present, should be used in a concentration sufficient to neutralize the hydrochloric acid formed and to maintain the pH at the desired level, but in no instance should it exceed the stoichiometric amount as based on the quantity of phosgene present.

If desired, the inhibited starch products may also be prepared by means of a dry reaction procedure. Thus, gaseous phosgene may be allowed to impregnate an agitated, dry mass of the selected starch base which should, preferably, be in a finely powdered form. The resulting system is then agitated at a temperature of from about 0 to 8° C. for a period of 1 to 8 hours and then at room temperature for an additional period of about 16 to 24 hours. This procedure is especially applicable for the reaction, with phosgene, of starch derivatives such, for example, as starch esters.

The resulting dry reaction product may be neutralized in a number of ways, depending upon the needs of the practitioner. Thus, it may be suspended in water and brought to pH level of about 5 to 8 by the addition of sodium hydroxide, or, if it is desirable to avoid suspension in water, the dry reaction product may ultimately be exposed to an ammonia atmosphere until the hydrochloric acid present therein is neutralized. Still another procedure involves treating the starch base, prior to reaction with phosgene, with an aqueous sodium hydroxide solution, drying the mass and thereupon proceeding in a manner as described hereinabove to conduct the reaction with phosgene.

In all cases, however, the intact granule starch products, resulting from the novel process of our invention, are assumed to be inhibited by the formation of carbonate ester linkages. As previously mentioned, these carbonate ester linkages may be easily split as a result of their sensitivity to acids, bases and heat, etc.

Our inhibited, granular starch products may show varying degrees of inhibition depending upon the extent of the reaction and the consequent number of resulting carbonate ester crosslinkages. The amount of granule inhibition may be determined by performing a sediment volume test. In the latter procedure, an aqueous dispersion of the inhibited product having a concentration of 1%, by weight, solids is cooked on a boiling water bath for about 20 minutes. The cooked dispersion is then allowed to stand in a graduated vessel, such as 100 ml. graduated cylinder, at room temperature for a period of about 16 hours. The thus cooked product will proceed to separate into layers on the basis of its relative inhibition. In extreme cases, it will completely settle out with the sediment so formed occupying different volumes depending upon the degree of inhibition of the reaction product. These sediments constitute insoluble granules of the starch derivative whose swollen volumes are relative to the degree of inhibition of the derivatives. Thus, because of their lower swelling and hydration capacity, the more inhibited, i.e. the more cross linked, products will yield smaller sediment volumes than correspondingly less inhibited products. Where, however, the original starch base, e.g. potato starch, exhibits no sediment formation because of the completely swollen, highly hydrated and/or disrupted nature of its granules, inhibition in the crosslinked product will be evidenced by the subsequent formation of sediment. This result is directly attributable to the toughened state of the crosslinked granules.

The products of this invention, because of their unique combination of properties, can be utilized in many applications. Thus, in the food industry they can be used as thickening agents for pies, sauces, and soups, etc. They are also applicable for use in various sizing, coating, and adhesive applications. In addition, these novel starch products may be used as dusting powders for surgical and cosmetic purposes, etc.

The following examples will further illustrate the embodiment of our invention. In these examples, all parts given are by weight unless otherwise noted.

Example I

This example illustrates the novel procedure of this invention for the preparation of inhibited granular starch products. It further illustrates the manner in which the degree of inhibition of these novel products is determined.

The following ingredients were introduced into a reaction vessel fitted with a condenser and a means for mechanical agitation:

| | Parts by weight |
|---|---|
| Corn starch (in intact granule form) | 100 |
| Water | 125 |
| Phosgene | 5 |

The phosgene was introduced into the agitated starch dispersion in a gaseous state. While agitation continued, the pH of the system was maintained at approximately 7 by the continued slow addition, thereto, of a 3% by weight, aqueous sodium hydroxide solution. The temperature of the system was kept at 5° C. during the entire reaction procedure. After agitation for 2 hours, at the aforementioned conditions, the slurry was adjusted to a pH level of 5, filtered, washed and dried. The resulting product had maintained its original granular form.

The degree of inhibition was determined by cooking an aqueous suspension of the resulting starch product, having a concentration of 1%, by weight, solids, in a boiling water bath for a period of 20 minutes. The cooked dispersion was then allowed to stand, at room temperature, in a 100 ml. graduated cylinder for a period of approximately 16 hours. In order to show comparative values, the cookability of the raw corn starch base was also determined by this method. The corn starch base thus showed a sediment volume of 46 milliliters in contrast to the 15 milliliters sediment volume of the inhibited starch reaction product. This comparison clearly illustrates the effectiveness of the process of this invention as a means of inhibiting granular starches.

The above described reaction procedures were then repeated, under identical conditions, with the exception that sodium carbonate and calcium hydroxide were utilized, respectively, as acid acceptors for the system. The degree of inhibition of the resulting reaction products was comparable to that of the product obtained when sodium hydroxide was employed.

Example II

This example illustrates the use of a variety of granular starch bases in the process of this invention. It also illustrates the high degree of inhibition of the resulting starch reaction products.

The general procedure utilized to prepare the products of this example was identical to the procedure as described in Example I, hereinabove. In all cases, an aqueous system was utilized and the pH of the system was adjusted to the desired level by the addition of a 3%, by weight, aqueous sodium hydroxide solution.

The following table lists the starch products, the components of the respective reaction systems, and the reaction conditions utilized. It further presents a comparison of the degree of inhibition of the resulting reaction products as compared with the starch bases from which they were, respectively, derived:

was prepared by means of the procedure as described in U.S. Patent No. 2,825,727, which issued on Mar. 4, 1958 and is assigned to the assignee of the subject application.

The following ingredients were introduced into a reaction vessel fitted with mechanical means for agitation:

| | Parts |
|---|---|
| Granular corn starch half ester of sodium sulfonatosuccinic acid | 100 |
| Phosgene | 5 |

The phosgene was introduced into the system in a gaseous state. The reaction proceeded, under agitation,

| Starch Base | Parts by wt. phosgene per 100 parts of starch | pH level of reaction | Reaction temp. (° C.) | Reaction time (hrs.) | Sediment Volume (ml.) Reaction product | Sediment Volume (ml.) Base |
|---|---|---|---|---|---|---|
| Corn starch | 5.0 | 7-8 | R.T. | 16 | 14 | 46 |
|  | 5.0 | 9 | <8 | 2 | 15 | 46 |
| Potato starch | 5.0 | 11 | <8 | 2 | 20 | 46 |
| High amylose corn starch (55% by wt., amylose) | 5.0 | 7 | <10 | 2 | 20 | (¹) |
| Waxy maize | 5.0 | 7 | <10 | 2 | 5 | 13 |
|  | 0.1 | 7 | R.T. | 2 | 85 | 90 |
|  | 0.2 | 7 | R.T. | 2 | 51 | 90 |
|  | 0.4 | 7 | R.T. | 2 | 39 | 90 |
| Oxidized corn starch (converted by reaction with NaOCl to a degree known in the trade, as 75 fluidity) | 5.0 | 7 | <10 | 2 | 53 | (¹) |
| Diethylamino ethyl ether of starch (prepared by means of procedure described in Ex. I and II of U.S. Patent No. 2,813,093) | 5.0 | 5 | 8 | 2 | 75 | (¹) |
| Corn starch octenyl succinate (prepared by means of procedure described in Ex. IX of U.S. Patent No. 2,613,206) | 5.0 | 6 | 8 | 2 | 25 | 45 |

¹ No sediment.

The data summarized, hereinabove, clearly indicate the effective inhibition achieved by means of the process of this invention regardless of the starch base utilized for the reaction.

Example III

This example illustrates the inhibition of a variety of granular starch bases using, in this instance, various non-aqueous reaction systems.

The procedure utilized in this example was identical to the precedure as set forth in Example I, hereinabove. The constituents of the respective reaction systems as well as the conditions utilized are described in the following table, as is also a comparison between the sediment volumes of the resulting reaction products and the sediment volumes of the starch bases from which they were respectively derived:

for a period of 2 hours at a temperature of 8° C. and, thereupon, for an additional 16 hours at room temperature. The resulting reaction product was then suspended in 125 parts of water and the pH of the system adjusted to 6.5 by the addition, thereto, of a 3%, by weight, aqueous sodium hydroxide solution. The resulting suspension was then filtered and the starch product was washed and dried.

The degree of inhibition of the reaction product thus obtained was determined by the sediment volume test, as described in Example I. Efficient and almost complete granule inhibition was evidenced by a sediment volume of 7 ml. in contrast to the lack of sediment formation on the part of the starch base under comparable conditions.

Example V

This example illustrates the lability of the carbonate

| Starch Base | Parts by wt. phosgene per 100 parts of starch | Reaction medium | Parts by wt. reaction medium | Reaction temp. (° C.) | Reaction time (hrs.) | Acid Acceptor | Parts, by wt. Acid Acceptor | Sediment Volume (ml.) Reaction product | Sediment Volume (ml.) Base |
|---|---|---|---|---|---|---|---|---|---|
| Corn starch | 5 | 1,2 dichloroethane | 125 | R.T. | 4 |  |  | 14 | 45 |
|  | 5 | Dimethyl formamide | 125 | R.T. | 4 |  |  | 8 | 45 |
| Potato starch | 5 | Toluene | 125 | <8 | 2 | Triethyl amine | 10.2 | 4 | (¹) |
|  | 5 | do | 125 | <8 | 2 | Ethylene diamine | 6.6 | 6 | (¹) |
| Oxidize corn starch (converted by reaction with NaOCl to a degree known, in the trade, as 75 fluidity) | 2 | 1,2 dichloroethane | 150 | <8 | 2 |  |  | 65 | (¹) |
| Corn starch (acid converted with HCl to a degree known, in the trade, as 75 fluidity) | 2 | 1,2 dichloroethane | 150 | <8 | 2 |  |  | ² 5/60 | (¹) |
| Yellow dextrin (heat converted starch) | 5 | Toluene | 125 | 8 | 2 |  |  | 90 | (¹) |
| Anhydrous borax fluidity of 7.2) | 5 | do | 125 | 60 | 2 |  |  | 3 | (¹) |
| Corn starch | 5 | Acetone | 125 | R.T. | 2 | Diethylamine | 3.7 | 28 | 53 |

¹ No sediment.
² This material formed a dense 5 ml. layer as well as a less dense 60 ml. layer; the two layers possibly being an indication of non-uniform inhibition.

The results summarized above clearly indicate that the effective inhibition of various starch bases may be achieved in non-aqueous systems by the novel process of this invention.

Example IV

This example illustrates the preparation of inhibited starch products using, in this instance, a dry reaction procedure.

The granular corn starch half ester of sodium sulfonatosuccinic acid utilized as the starch base in this reaction, ester crosslinkages of the inhibited, granular starch products of this invention, when the latter crosslinkages are exposed to an excess of either heat, or alkalinity and to a lesser degree when exposed to acidity. It further illustrates the necessity for maintaining the reaction system within the preferred pH range.

(A)—Effect of prolonged exposure to heat at neutral pH

The third waxy maize formulation, described in Example II hereinabove, was subjected to an additional 4 hours of cooking in boiling water. The resulting product closely resembled the base starch with regard to its viscosity and clarity as well as its degree of inhibition as indicated by a sediment volume of 89 ml. as compared with a 90 ml. value for the waxy maize starch base and 39 ml. for the inhibited starch product prior to its exposure to prolonged heating.

(B)—Effect of exposure to increased acidity and alkalinity

The reaction procedure of Example I was repeated in order to prepare an inhibited starch product consisting of the formulation described below. The only exception was that, in this instance, the reaction proceeded for 16 hours at room temperature.

|  | Parts |
|---|---|
| Corn starch (in intact granule form) | 100 |
| Water | 125 |
| Phosgene | 5 |
| Calcium hydroxide | 4.2 |

The degree of inhibition of the resulting reaction product as well as of the control cook of the corn starch base was determined, at a variety of pH levels, by the sediment volume test, as described in Example I, hereinabove. The pH level of the system was varied before cooking by the addition, to the 1% suspension of starch, of small amounts of dilute, aqueous solutions of either HCl or NaOH. The results are presented in the following table:

|  | Sediment Volume Test (milliliters) at pH | | | | |
|---|---|---|---|---|---|
|  | 2 | 5 | 7 | 9 | 10 |
| Inhibited corn starch reaction product | 10 | 9 | 10 | 18 | 44 |
| Control (i.e. corn starch base) | | | 45 | | |

The destructive effect of increased alkalinity upon the labile carbonate ester crosslinkages of our novel derivatives is indicated by the data summarized above. Thus, at a pH of 9, the destruction of the carbonate ester crosslinkages became evident and at a pH of 10, or higher, the behavior of our reaction products closely resembled that of the control corn starch base.

The above cited data also point up the necessity for conducting the process of our invention within the preferred pH range of 5 to 7, in order to avoid the premature destruction of the inhibiting crosslinkages.

Summarizing, this invention provides a unique method for the preparation of inhibited granular starch products. It further provides inhibited granular starch products which exhibit labile crosslinkages, and, thereby, the unique property of delayed and controllable granule swelling.

Variations may be made in proportions, procedures, and materials without departing from the scope of this invention which is limited only by the following claims.

What is claimed is:

1. A process for the preparation of inhibited, intact granule starch products corresponding to the formula:

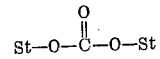

wherein St represents the starch molecule; said process comprising reacting a starch base with phosgene at a temperature of from about 0–60° C. and for a period of from about 0.5 to 16 hours subsequent to the complete admixture of the phosgene with said starch product; the medium for said reaction being selected from the group consisting of: (1) a dry, completely solvent-free medium; (2) an aqueous medium having an acid acceptor admixed therein; and, (3) an organic solvent medium; the pH of the system being maintained at a level of from about 3–11 during the course of the reaction.

2. The process of claim 1, wherein said phosgene is present in a concentration of from about 0.1 to 100 parts, by weight, per 100 parts, by weight, of the starch base.

3. The process of claim 1, wherein said organic solvent medium is admixed with an acid acceptor.

4. An inhibited, intact granule starch product characterized by its labile, carbonate-ester linkages, said starch product corresponding to the formula:

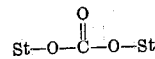

wherein St represents the starch molecule; said starch product being prepared by the process of claim 1.

References Cited

UNITED STATES PATENTS 3,284,442   11/1962   Jarowenko et al. ---- 260—233.5
3,238,193   3/1966   Tuschhoff et al. ---- 260—233.5

DONALD E. CZAJA, *Primary Examiner.*

R. W. MULCAHY, *Assistant Examiner.*